US006932489B2

(12) United States Patent
    Sooferian

(10) Patent No.: US 6,932,489 B2
(45) Date of Patent: Aug. 23, 2005

(54) SOLAR STEPPING STONE

(76) Inventor: Danny H. Sooferian, 425-I Constitution Ave., Camarillo, CA (US) 93012

( * ) Notice: Subject to any disclaimer, the term of this patent is extended or adjusted under 35 U.S.C. 154(b) by 0 days.

(21) Appl. No.: 10/292,339

(22) Filed: Nov. 12, 2002

(65) Prior Publication Data

US 2003/0090896 A1 May 15, 2003

Related U.S. Application Data

(60) Provisional application No. 60/332,227, filed on Nov. 14, 2001.

(51) Int. Cl.[7] .................................................. F21S 8/00
(52) U.S. Cl. ........................ 362/145; 362/153; 362/802
(58) Field of Search ................................. 362/145, 153, 362/153.1, 183, 146, 267, 276, 802, 806; 40/564, 565; 404/22, 23

(56) References Cited

U.S. PATENT DOCUMENTS 5,678,920 A * 10/1997 Kerr ............................ 362/145
6,339,188 B1 * 1/2002 Voelkner ..................... 362/183
6,354,714 B1 * 3/2002 Rhodes ...................... 362/153.1

* cited by examiner

*Primary Examiner*—Y. My Quach-Lee
(74) *Attorney, Agent, or Firm*—Colin P. Abrahams

(57) ABSTRACT

A solar stepping stone comprises a housing having an upper surface, side walls and a lower surface, the housing defining a chamber. A solar energy collector is associated with the housing for collecting solar energy. A solar power storage device is provided in the chamber for receiving and storing solar energy received from the solar energy collectors. An illuminator for illuminating at least a portion of the upper surface of the solar stepping stone is contained in the chamber and is powered by solar energy stored by the solar power member.

24 Claims, 7 Drawing Sheets

SOLAR STEPPING STONE

CROSS REFERENCE TO RELATED APPLICATIONS

This application claims the benefit of United States Provisional Application No. 60/332,227 filed Nov. 14, 2001, which is incorporated herein by reference in its entirety.

FIELD AND BACKGROUND OF THE INVENTION

This invention relates to stepping stones for use in outdoor environments. Particularly, the invention relates to such stepping stones which contain a source of light associated with the stepping stone in order to provide guidance and direction to users thereof at night. The source of light associated with the stepping stone is, according to the invention, typically powered by solar energy which is collected, held and dispensed by the solar stepping stone of the invention as needed.

Outdoor and garden lighting is in widespread use in many different types of environments, and is used for the purposes of providing illumination to certain areas or pathways during times of darkness to persons walking through that particular area. The outdoor garden lighting may also be used for aesthetic and artistic effects produced by the lighting to beautify the area. Such outdoor lighting may typically comprise lanterns mounted on posts or bases, and which may be powered either by batteries, electrical sources or even solar energy.

Various forms of landscaping or stepping stones are described in the patent literature. For example, U.S. Pat. No. 6,116,751 (Remp) discloses a lighted landscaping stone having a body and an upper translucent panel, and an elongated light-emitting member arranged within a cavity defined thereby, the light-emitting member being of a serpentine pattern. In a preferred form, the light-emitting member is a fiber optic line. An energy cable is connected to an electric outlet, providing a source of power for illumination.

U.S. Pat. No. 4,697,950 (Copeland) describes an illuminated stepping pad to be buried in the ground, and has a circular base, an upright continuous side wall and a lid which displays messages, ornamental graphics or the like. A light is carried on the base, and the lid is translucent to permit diffusion of the light therethrough. Illumination occurs by applying low voltage power, from an electrical power source, through electrical leads.

U.S. Pat. No. 4,744,014 (Harris) discloses another form of low voltage lighting system, in the form of a stepping stone, with each stepping stone having a recessed channel in the upper face thereof and a light source removably inserted within this channel. The light source is a flexible, substantially transparent tube and low voltage lights within the tube. The light source is connected to a power source, and, more particularly, a low voltage power source, to facilitate the desired illumination.

U.S. Pat. No. 4,992,914 (Heiss) teaches an illuminated stepping stone which is lightweight, but can support the weight of a person, and includes a light bulb which is connected to a low voltage electrical power source.

Various patents show the use of solar energy to provide illumination on certain devices. For example, U.S. Pat. No. 5,839,816 (Varga) describes a road marker which may have batteries or solar collectors to provide illumination at night. U.S. Pat. No. 4,835,664 (Wen) shows a lighting fixture for the outdoors, of generally conventional shape and form, which is typically mounted on a frame, and stands above the ground or is mounted on a wall. A solar energy absorbing plate is provided, as well as a lens, focusing reflector and other components. Finally, Design Patent No. 309,953 (Chien) shows a solar powered light of specific ornamental design, namely, hexagonal generally flat-shaped with a centrally formed light.

SUMMARY OF THE INVENTION

According to one aspect of invention, there is provided a solar stepping stone comprising: a housing having an upper surface, side walls and a lower surface, the housing defining a chamber; solar energy collectors associated with the housing for collecting solar energy; a solar power storage member in the chamber for receiving and storing solar energy received from the solar energy collectors; an illumination member for illuminating at least a portion of the upper surface of the solar stepping stone, the illumination member being powered by solar energy stored by the solar power member. Preferably, the solar power member comprises a battery such as a photovoltaic (PV) battery.

Preferably, the chamber comprises one or more recessed cavities, preferably centrally located, extending downwardly from the upper surface of the housing, and there may be a transparent or translucent cover over the chamber, or a part thereof, the cover preferably being substantially flush or integral with the upper surface of the housing. The chamber and cover may be configured so as to provide an airtight and waterproof sealed space. Further, at least a portion of the upper surface may have a decorative design thereon. The cover may be of a preselected shape, or be tinted so as to have a specific color.

Preferably, the solar energy collector is formed so as to be flush with the upper surface of the housing, and may have a protective covering thereon to prevent damage from normal use of the solar stepping stone. In one embodiment, the solar energy collectors are formed around the periphery of the chamber. The solar energy collector may be separated from the housing and connected to the solar power storage member by electrical connectors. The solar energy collector could be located in an adjacent or proximal solar stepping stone and connected to the solar power storage member by electrical connectors.

A light sensor for detecting ambient light conditions may be provided, the light sensor switching the illumination member off when ambient light conditions exceed a predetermined threshold. There may also be a manual on/off switch for activating or deactivating illumination member.

In one embodiment, the solar stepping stone may comprise a motion detector associated therewith for detecting proximal motion such that the illumination member will only be switched on when ambient motion is detected. A timer means for setting the periods of time when the solar stepping stone will be activated and deactivated may be provided.

The housing may be comprised of a material selected from at least one of the following: resin, fiberglass, a resin and fiberglass mix, concrete, acrylics, plastics, aluminum or other metals, stone powder with resin, stone pebbles, slate or tile. The illumination is preferably selected from an LED and/or light bulb.

According to another aspect of the invention, there is provided a method of illuminating an outdoor pathway comprising: arranging a plurality of solar stepping stones with respect to each other so as to be spaced along a surface of the pathway, forming an illuminating member within a chamber contained within at least some of the solar stepping stones; associating a solar energy collector with at least one solar stepping stone to collect solar energy during hours of sunlight; storing the collected solar energy in a solar power storage member preferably located in the chamber of the solar stepping stone; and selectively powering the illuminating member so as to provide illumination through a translucent or transparent lens formed in the upper surface of the solar stepping stone. The method may further comprise the step of attaching a light sensor to the solar stepping stone so that the illuminating member will only be activated when ambient light conditions fall below a preset value.

In yet another aspect of the invention, there is provided a solar stepping stone including a light source, wherein the light source is powered by solar cells which collect energy from the sun during the daylight, and which energy is then used to light or illuminate the stepping stones at night.

In yet a further aspect of the invention, the stepping stone may comprise one or more light sensors so that the light source in, or associated with, the stepping stone will become activated when the ambient light conditions drop below a predetermined amount.

The present invention provides a source of lighting for outdoor areas and gardens by incorporating a light source within a stepping stone which may be laid and secured in the ground, and wherein a plurality of such stepping stones are arranged sequentially so as to provide an illuminated pathway.

The stepping stone of the invention may be comprised of any appropriate material, such as, for example, resin, fiberglass, a resin and fiberglass mix, concrete, acrylics, plastics, aluminum or other metals, stone powder with resin, stone pebbles, slate or tile. At some point or area in the upper surface of the stepping stone, a light source is located in order to provide illumination. The stepping stone may thus comprise an aperture, recess or cutaway portion along any part of its upper surface to define an entry into a chamber below the upper surface, and within which the light source may be received.

Preferably, the light source is covered by a strong, weather-resistant and/or waterproof cover, which would provide the necessary protection to the light source and its associated components, as will be discussed below, and also to form a weather-proof seal to prevent damage to the light source from rain, irrigation systems, atmospheric moisture or the like.

In another aspect, the solar stepping stone of the invention may be comprised of different forms and configurations. It is therefore within the scope of the invention to provide electrical connections between adjacent stepping stones, whereby one stepping stone incorporates solar collector and storage devices, and is electrically connected to adjacent or proximal solar stepping stones without such solar collectors or storage devices so as to illuminate a light source therein. In another variation, solar collectors may be placed in one solar stepping stone, with some or all of the proximal stepping stones being electrically connected thereto so as to be able to store electrical energy in individual stepping stones without solar collectors, and to supply such electrical energy to a light source therein, or to other solar stepping stone which have neither solar collectors nor electrical storage areas.

In accordance with another aspect of the invention, the solar stepping stone of the invention may comprise a transparent lens over a part of or the entire of upper surface. While the lens will be translucent to permit the diffusion of light from the light source inside the stepping stone to the outside of the solar stepping stone, the lens may be, in whole or in part, of a particular color or colors to provide the desired effect. Moreover, where the lens is less than the entire upper surface of the stepping stone, the lens itself, or a part thereof, through which the light diffuses, may be of desired shapes or configurations, so as to provide a number of different attractive designs. For example, the lens may be square, circular, star-shaped, of an irregular shape, or shaped in the form of a lantern, house, or any such other object. Further, the lens may incorporate direction markers, such as arrows, to provide direction for those using the solar stepping stones.

BRIEF DESCRIPTION OF THE DRAWINGS

The invention may be illustrated with reference to the following drawings:

FIG. 8 also shows the presence of a timer 102, represented schematically within the solar stepping stone 10.

DETAILED DESCRIPTION OF THE INVENTION

The various illustrations described herein show different embodiments of a solar stepping stone of the invention. Essentially, the stepping stone comprises a housing preferably but not necessarily made of lightweight material, the housing emulating a garden stepping stone, and which may have ornamentation thereon, taking many different forms. A sealed housing is provided with a translucent lens, so that light can diffuse from a light source therein to the outside of the solar stepping stone. Further, the solar stepping stone comprises solar collectors for collecting solar energy and conveying such energy to solar storage devices for use when necessary.

Figure 1:
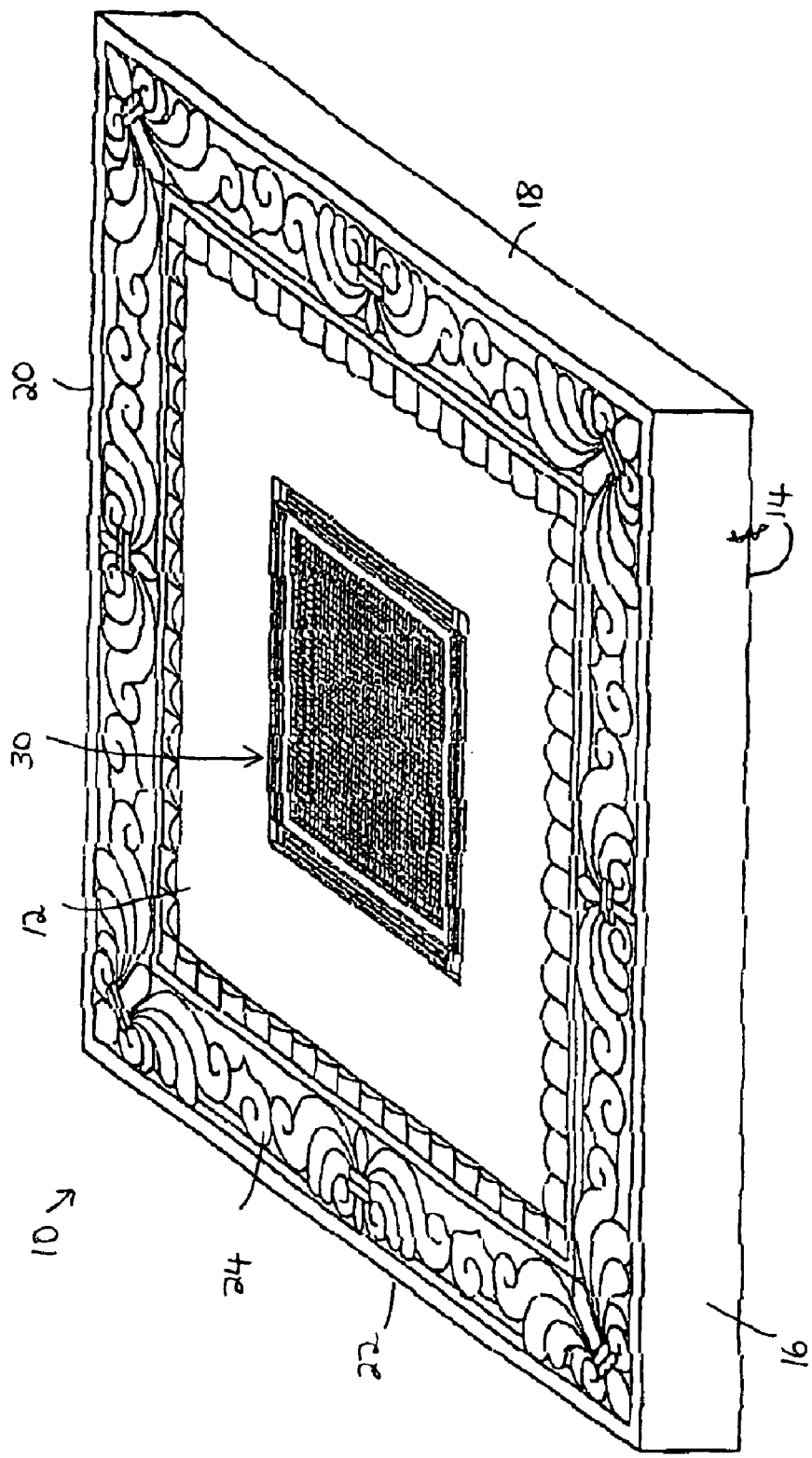
FIG. 1 is a perspective view of an illuminated stepping stone of the invention.

Reference is now made to FIG. 1 of the drawings which shows a first embodiment of a solar stepping stone 10 of the invention, in this case one which is generally of a square shape. The stepping stone 10 comprises an upper surface 12, a lower surface 14, and side walls 16, 18, 20 and 22. While the solar stepping stone 10 in FIG. 1 is shown to be of square shape, a solar stepping stone in accordance with the invention may be of any desired shape, including circular, elliptical, rectangular or anything else. In the solar stepping stone 10, a decorative outer periphery 24 is provided to form an attractive ornamentation to the stepping stone 10. Once more, it should be appreciated that the decoration may take large numbers of different forms, so that the decorative elements shown in FIG. 1 may be modified, or, indeed, totally absent from the upper surface 12 of the stepping stone 10, which could therefore have no design at all.

An illumination system is mounted more or less centrally within the stepping stone 10, the illumination system being indicated by reference numeral 30. As will be described below with reference to the other Figures, the illumination system 30 includes solar energy collectors, an energy storage source, a light or lamp source, and various other components which may be present, such as light sensors, pressure sensors, motion detectors and the like.

Figure 2:
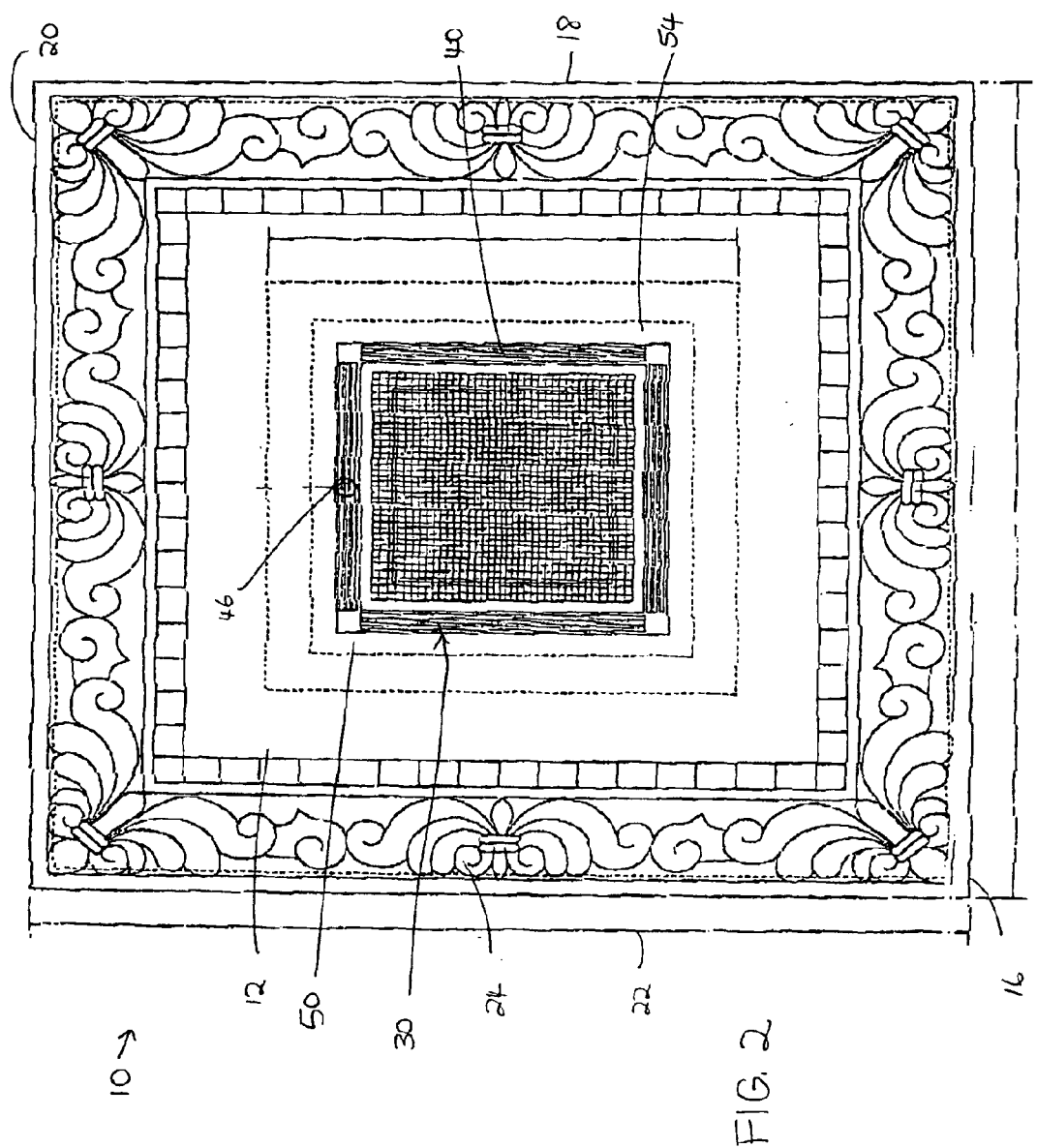
FIG. 2 is a top view of the stepping stone shown in FIG. 1 of the drawings.
Figure 3:
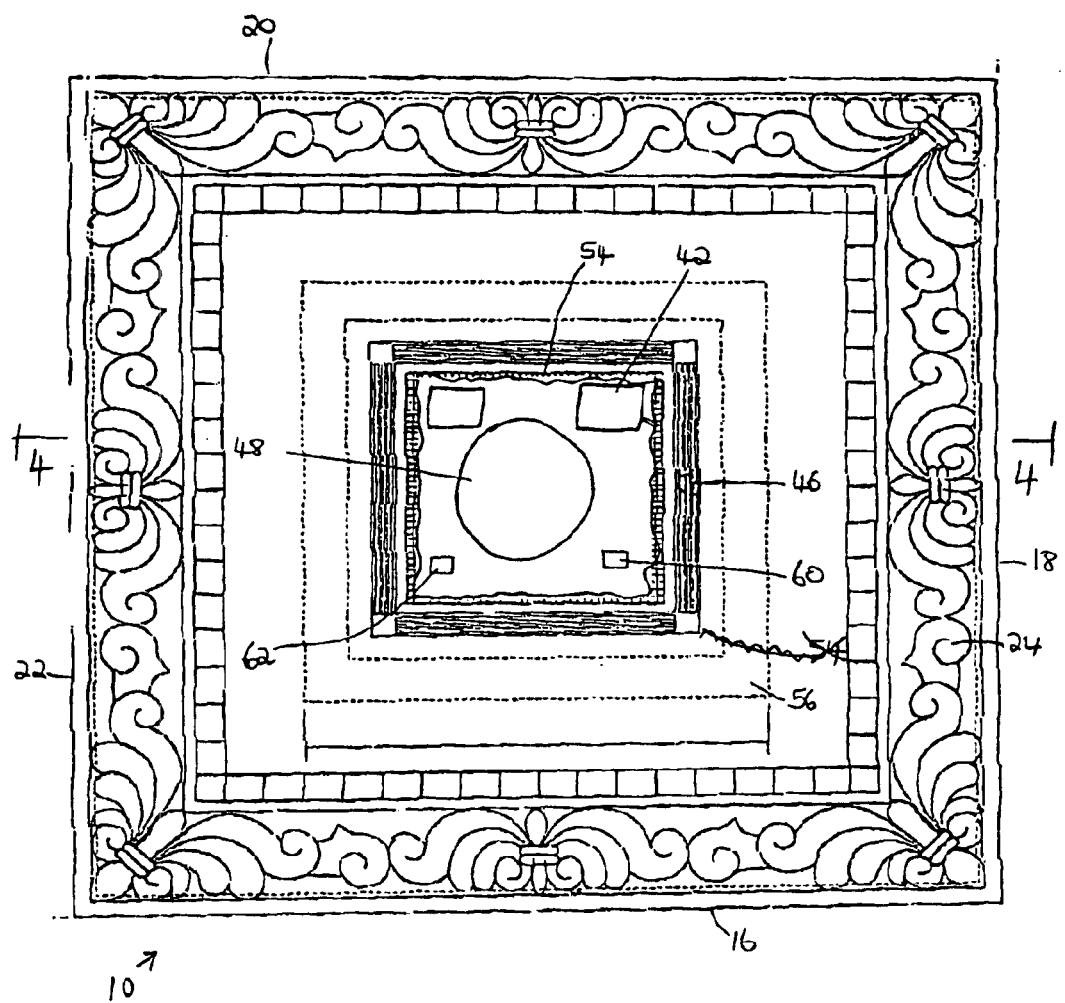
FIG. 3 is a top view of a stepping stone shown in FIG. 1 of the drawings, with the cover partially removed to show the various internal components for illumination contained within the stepping stone.

FIG. 2 of the drawings shows a top view of the solar stepping stone 10 illustrated in FIG. 1, while FIG. 3 shows a top view of the solar stepping stone shown in FIG. 2, but with most of the lens removed so as to show some of the components within the chamber to be described. These may best be understood by referring first to FIG. 4 of the drawings.

Figure 4:
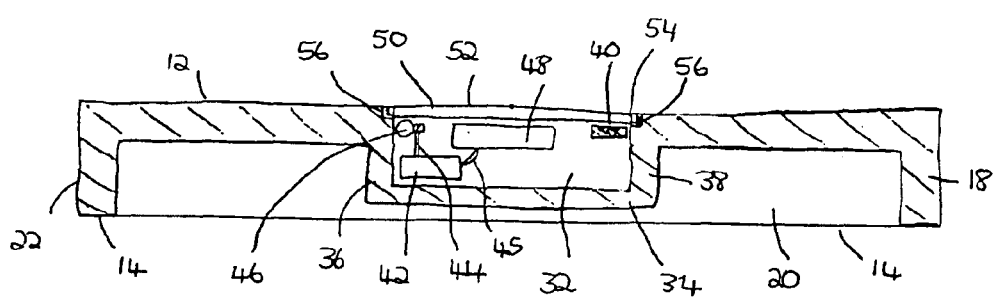
FIG. 4 is a cross-section representation through the stepping stone along line 4—4 which is shown in FIG. 3 of the drawings.

In FIG. 4, it will be seen that the stepping stone 10 comprises a chamber 32 which is defined by a base wall 34 and side walls 36 and 38. Each of the side walls 36 and 38 is connected to, or integral with, the upper surface 12, and joins the base wall 34 to define the chamber 32. Within the chamber 32 there is formed a solar cell 40, also seen in other Figures, the solar cell 40 comprising a peripheral strip extending substantially around the perimeter of the chamber 32. In the particular embodiment shown, the solar cell 40 comprises solar energy collectors, and the energy so collected is stored in a solar energy storage member 42. The electrical connectors 44 extend between the solar cell and the energy storage member 42 so that solar energy can be transmitted to the energy storage member 42 during the day, or under sunny conditions, while the energy so stored will be transmitted to a light or illumination source, as will be described, during hours of darkness.

Within the chamber 32, there is also located at least one light sensor 46 which senses the amount of light in the ambient environment. The light sensor 46 is appropriately set so that it will activate or deactivate the system 30 according to predetermined light conditions. The light sensor is thus in direct or indirect electrical contact with the energy storage member 42, and will prevent the flow of energy from the energy storage member 42 until such time as the ambient light conditions have dropped below the predetermined minimum. It will also be appreciated that the illumination system 30 may also be manually controlled by an on/off switch so that it can switched on or off exactly when desired. Further, the on/off manual switch may work in conjunction with the presence of a light sensor so that the system 30 must be both switched on and the ambient light conditions below the predetermined minimum before illumination will occur.

A light source 48 is located within the chamber 32, the light source 48 being electrically connected to the energy storage member 42 by connectors 45.

The chamber 32 is sealed by a cover member 50, which may be comprised of a transparent or semi-transparent material, such as an acrylic resin, which is very strong so as to be able to sustain considerable weight by an object on the stepping stone without breaking. The cover member 50 is sealingly engaged with the upper surface 12 of the stepping stone 10, to protect the contents of the chamber 32, as has been described.

The cover member 50 comprises an upper surface 52 and an edge portion 54. The cover member 50 is mounted so that the upper surface 52 thereof is substantially flush with the upper surface 12 of the stepping stone so that the stepping stone 10 and cover member 50 will present, in combination, a continuous, smooth surface. The edge portions 54 are received within, and mounted on, a step 56 constructed into the upper surface 12 of the stepping stone 10, and a tight fit formed. If necessary, appropriate glue or other sealing methods may be used so as to ensure that the chamber 32 is fully sealed against the elements.

In use or operation, a series of stepping stones 10 are preferably arranged serially or sequentially with respect to each other so as to define a pathway in an outdoor environment, such as adjacent a residential or commercial building or property. Each stepping stone 10 is laid within the soil or earth, preferably so that the side walls 16, 18, 20 and 22 are below the surface of the ground, with the lower surface 14 of the stepping stone 10 being located and mounted on the earth surface which forms a substrate for the stepping stone 10. Further, the base 34 also preferably rests on the surface or substrate, preferably providing a foundation upon which the base 34 can rest.

The stepping stone 10 is preferably located in an area which receives sun during at least a portion of the daylight hours. During this time, the solar cell 40 within the chamber 32 absorbs and is charged with solar energy, and this energy is stored in the energy storing member 42.

The light sensor 46 senses the ambient light conditions, and, when light exceeds certain levels, disconnects the energy storage member 42 from the light source 48. However, when the ambient light conditions grow sufficiently dark, the light sensor 46 will activate the connection between the energy storage member 42 and the light source 48. The light source 48 will thus be illuminated and the light emanating therefrom will pass or diffuse through the transparent or translucent cover member 50 and provide light for users of the path defined by the plurality of stepping stones 10.

The stepping stones 10 may contain within the chamber 32, or at some other convenient location thereon, other sensors and detectors aside from the light sensor 46. Thus, for example, a motion detector, shown generally by reference numeral 60 in FIG. 3 of the drawings, may be provided. The motion detector 60 alone, or in combination with the light sensor 46, will determine when the light source 48 becomes illuminated. In this regard, where the motion detector 60 detects motion when ambient light conditions are high, the light source 48 will not be illuminated. However, when the light levels drop below a predetermined level, detection of motion by the motion detector 60 causes the light source 48 to be illuminated. In this way, the light source will only be illuminated when light drops below a certain level, and movement is detected. This may serve to conserve the amount of energy used by the light source 48, which will only draw upon the energy storage member 42 under appropriate conditions and when necessary.

The stepping stone 10 may also, or in the alternative, contain a pressure sensitive monitor 62, shown in FIG. 3 of the drawings, which may operate in conditions somewhat analogous to the motion detector 60 described above. In other words, the light source 48 will only become illuminated when the light sensor 46 senses that the ambient light is at sufficiently low levels, and pressure is applied to the stepping stone 10, or adjacent stepping stones connected thereto, by a user.

The stepping stone 10 may be comprised of a wide variety of different materials, and may be in many different shapes and forms. Further, each stepping stone 10 may comprise means for receiving remote control signals so that the stepping stones can be switched on or off from a distance. Additionally, timers or clocks may be incorporated so that the times during which the illuminated stepping stones will be active for operation can be set by user.

In one arrangement, the solar energy collectors and/or power storage members may be separated from the stepping stone 10. Thus, the energy collectors may be optimally placed away from the stepping stone to maximize collection of sunlight energy, and these energy collectors may be electrically connected to one or more stepping stones as suppliers of electrical energy.

The solar stepping stone 10 is preferably comprised of strong materials to be shock resistant. It is important that the chamber 32 be appropriately sealed against the elements, so that water will not seep therein and damage the components. A preferred form of cover member 50 is a fairly thick piece of acrylic, transparent or semi-transparent material, which will protect the internal components. Further, the lens or cover 50 may be one or more of a variety of colors. The shape of the cover 50 itself may vary so that it forms an aesthetically pleasing design, whether geometric or other such as a house, tree, animal or the like.

The light source may be any one of a number of colors, such as white, amber, blue, green etc. The light source may be an LED, which itself may be of different colors, or it may use color filters in conjunction with the LED to provide the desired light color. As an alternative to being an LED, the light source may be a regular electrical bulb which may be designed and appropriate for use in the stepping stone.

Figure 5A:
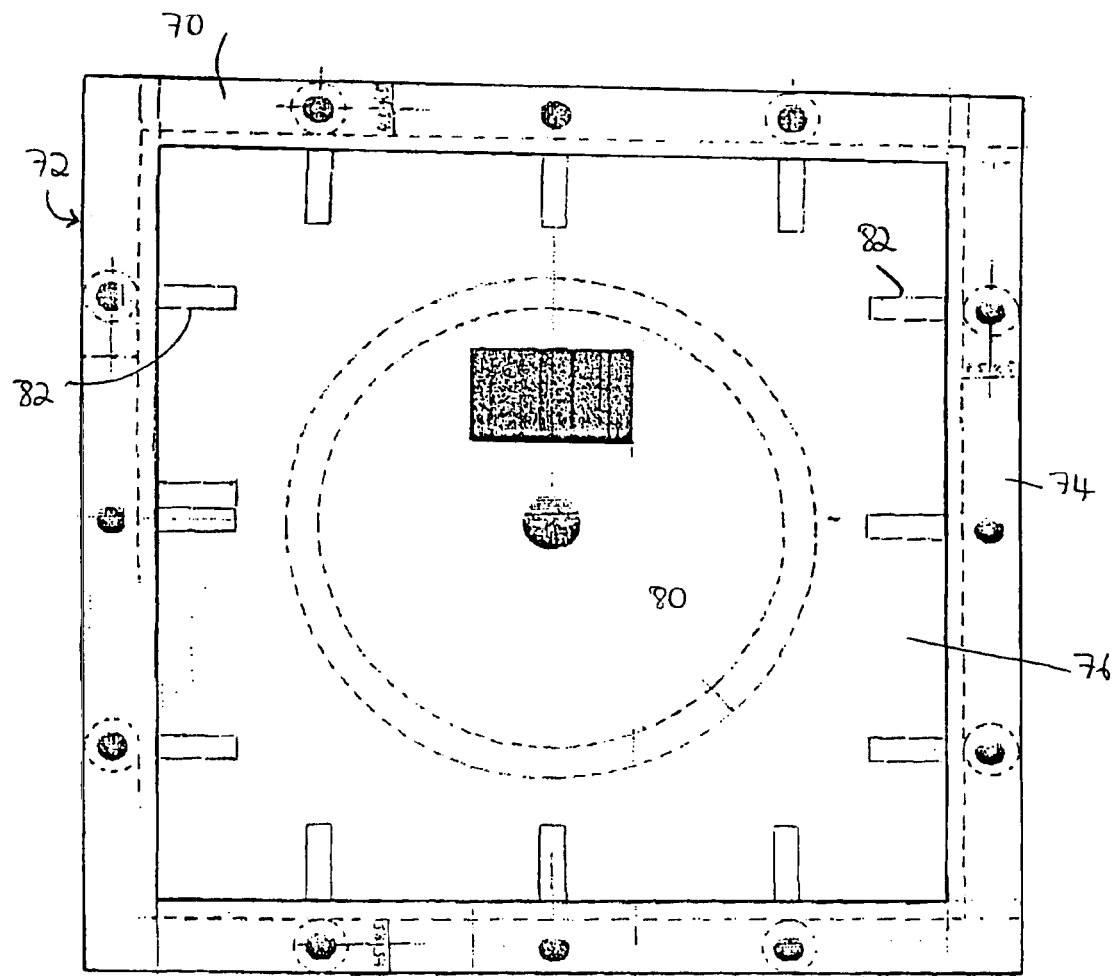
FIGS. 5(a) and 5(b) are a top and side view of the housing of the stepping stone of the invention in another embodiment thereof.
Figure 5B:
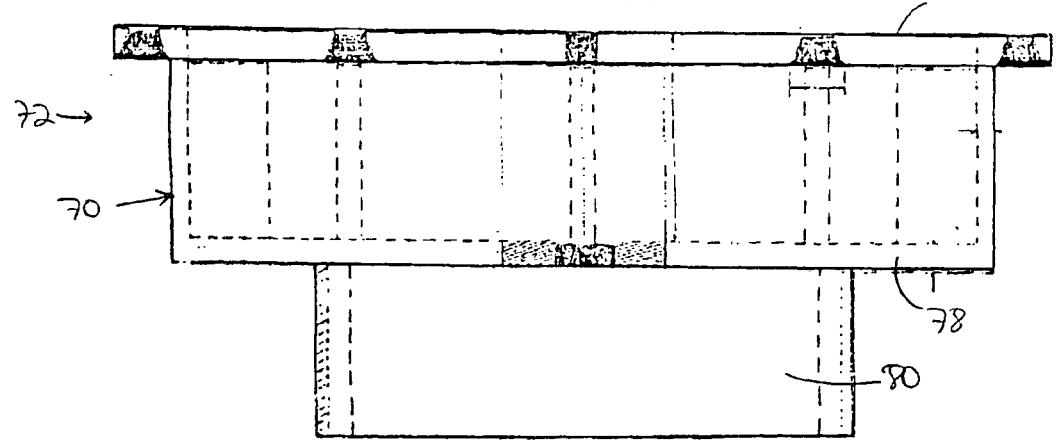

FIG. 5(*a*) and FIG. 5(*b*) show another embodiment of the housing 70 of a solar stepping stone 72 in accordance with the invention. The housing 70 is essentially square in shape, having side walls, 74, an upper surface 76, an lower surface 78, and a circular chamber 80. Ribs or supports 82 are provided to give additional strength and resilience to the solar stepping stone 72 so that it can withstand considerable weight. The various components, including the solar energy collectors, illumination source, energy storage and the like are contained within the circular chamber 80, which is typically covered by a cover or lens as described above. Other components which may form the various embodiments of the solar stepping stone 72, such as motion detectors, pressure sensors, and the like, will also be contained within the chamber 80.

Figures 6, 7:
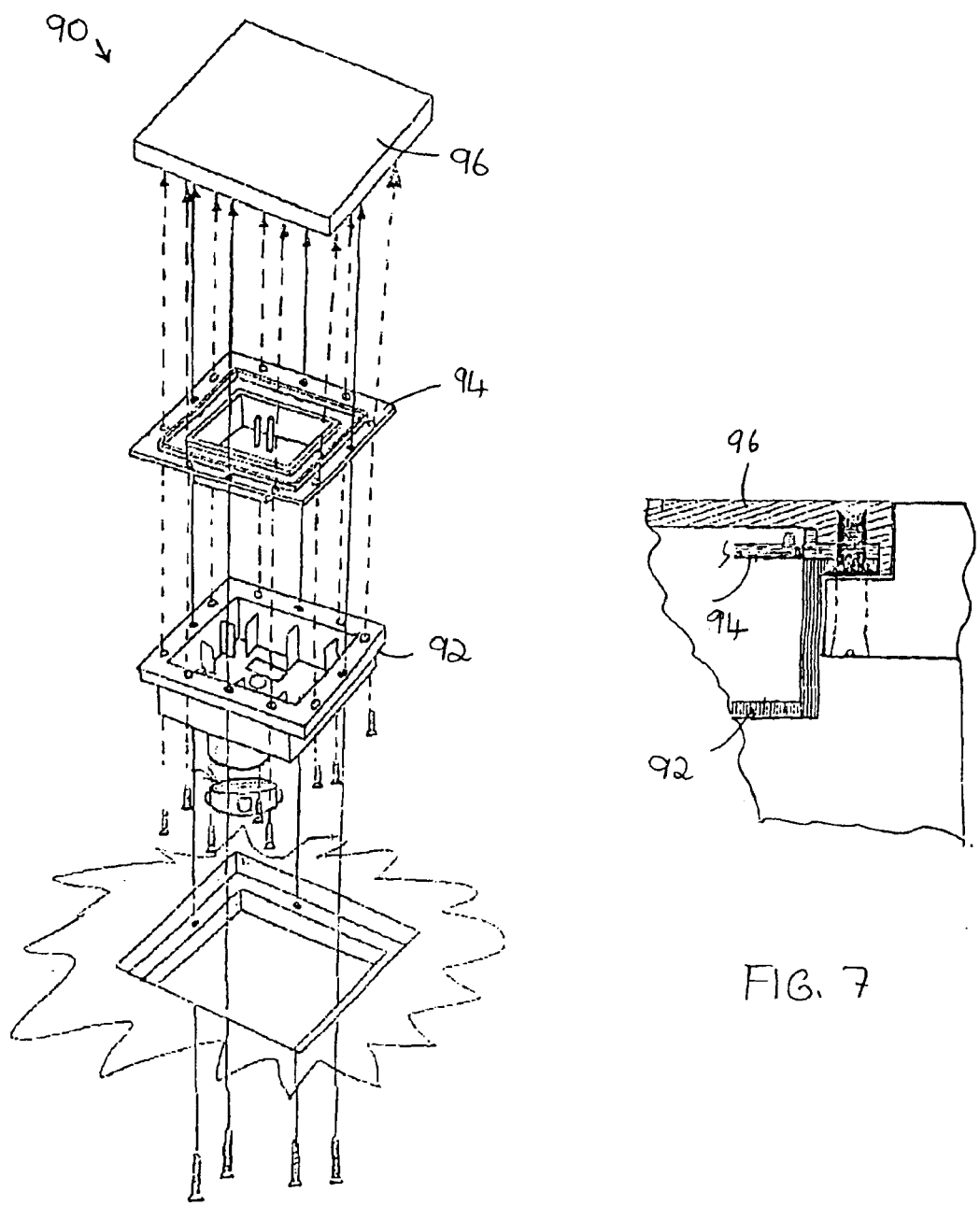
FIG. 6 is an exploded view of another embodiment of the stepping stone of the invention showing various components thereof and their structural interrelationship.
FIG. 7 is a detailed section showing the seal between components of the solar stepping stone in one embodiment thereof.

FIG. 6 shows an exploded view of another embodiment of the invention. FIG. 6 shows a solar stepping stone 90 comprising a housing 92 in which is received certain components, including the support 94 for the solar collectors. A covering or lens 96 is bolted to the housing 92 and support 94. The solar stepping stone 90 fits within the ground as shown in FIG. 6. With respect to FIG. 7, a detailed view showing the cover 96, support 94 and housing 92 are shown as bolted together to provide a solid airtight and waterproof seal, to protect the components.

Figure 8:
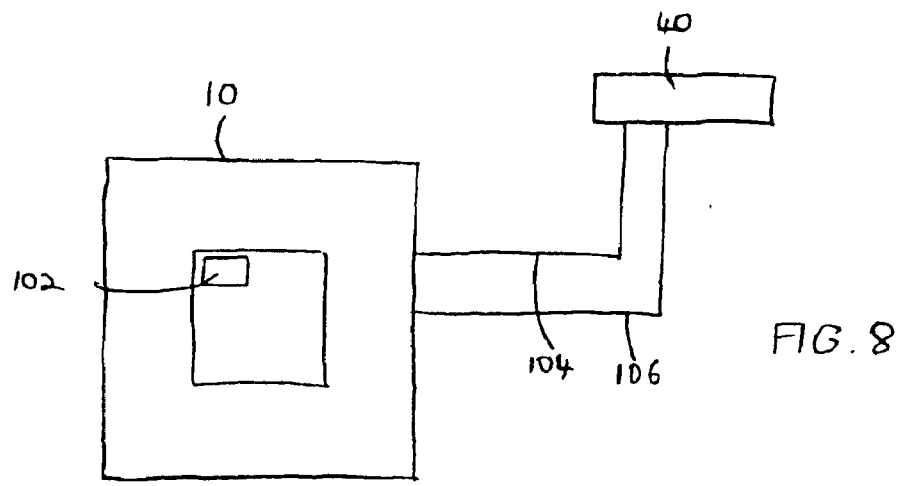
FIG. 8 shows a solar stepping stone 10 of the invention having a solar energy collector 40 separated from the housing and connected to the solar power storage member by electrical connectors 104 and 106.

FIG. 8 shows a solar stepping stone 10 of the invention having a solar energy collector 40 separated from the housing and connected to the solar power storage member by electrical connectors 104 and 106. FIG. 8 also shows the presence of a timer 102, represented schematically within the solar stepping stone 10.

Figure 9:
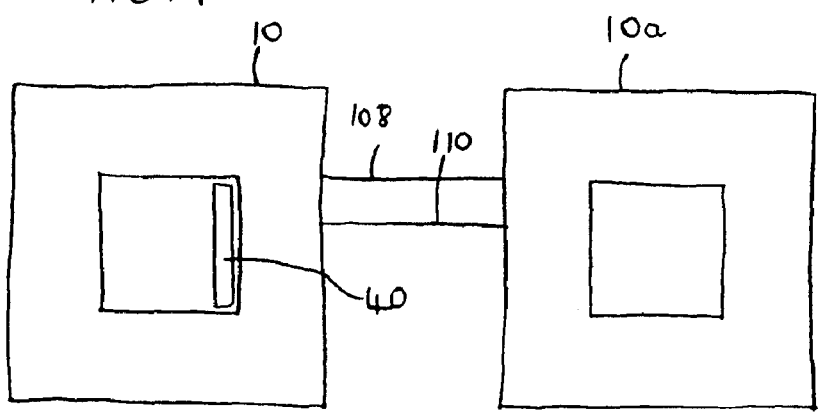
FIG. 9 is a schematic representation of a plurality of stepping stones showing the solar energy collector located in one stepping stone and connected to the solar power storage member of an adjacent or proximal stepping stone by electrical connectors.

FIG. 9 shows a pair of proximal solar stepping stones 10 and 10*a* with the solar energy collector located in stepping stone 10, the solar stepping stone 10 being located proximal or adjacent solar stepping stone 10*a*, with the solar energy collector 40 connected to the solar power storage member of solar stepping stone 10*a* by electrical connectors 108 and 110.

Figure 10:
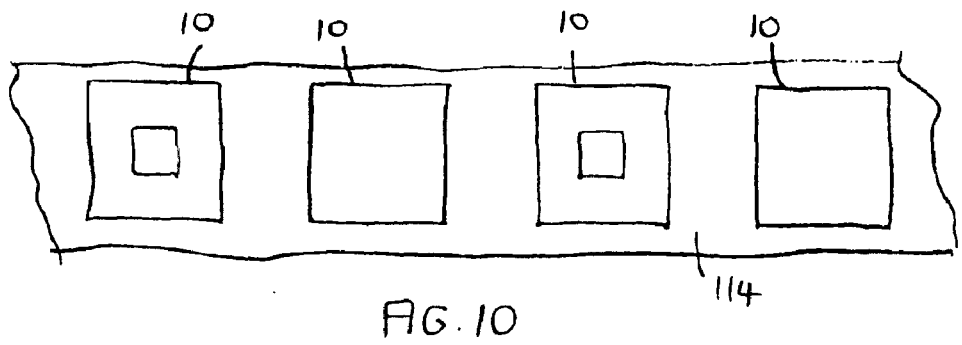
FIG. 10 is a schematic representation of a plurality of solar stepping stones spaced along the surface of a pathway with an illuminating member within a chamber contained in at least some of the stepping stones.

FIG. 10 shows a plurality of stepping stones 10 spaced along the surface of a pathway 114 with an illuminating member within a chamber contained within at least some of the solar stepping stones, in this case in alternate stepping stones.

It will be appreciated that the solar stepping stone in its various embodiments of the invention will contain the solar collector such as solar panels or cells, energy storage such as photovoltaic cells, and illumination devices such as LEDs or bulbs, either within the stepping stone or immediately proximal thereto to collect solar energy. However, it will also be appreciated that certain solar stepping stones may have neither the solar collectors nor the energy storage but may be electrically connected to adjacent or proximal solar stepping stones which do have these components, thereby obtaining their solar energy for illumination from those which are appropriately equipped with the solar collectors. As an alternative, a solar stepping stone may have a solar energy storage device, which may receive solar energy through electrical connections from proximal or adjacent solar stepping stones which are duly equipped with the solar energy collection devices.

The invention is not limited to the precise details described herein, but may comprise a number of variations, within the scope of the invention.

What is claimed is:

1. A solar stepping stone comprising:
   a housing having an upper surface, side walls and a lower surface, the housing defining at least one chamber comprising a recessed cavity extending downwardly from the upper surface of the housing;
   at least one solar energy collector associated with the housing for collecting solar energy;
   a solar power storage member in the chamber for receiving and storing solar energy received from the solar energy collectors; and
   an illumination member for illuminating at least a portion of the solar stepping stone, the illumination member being powered by solar energy stored by the solar power member.

2. A solar stepping stone as claimed in claim 1 wherein the recessed cavity is a recessed central cavity extending downwardly from the upper surface of the housing and the solar power storage member is located in the chamber.

3. A solar stepping stone as claimed in claim 1 further comprising a transparent or translucent cover over the chamber, the cover being substantially flush with the upper surface of the housing.

4. A solar stepping stone as claimed in claim 3 wherein the chamber and cover are configured so as to provide an airtight and waterproof sealed space.

5. A solar stepping stone as claimed in claim 3 wherein the cover is tinted so as to have a specific color.

6. A solar stepping stone as claimed in claim 1 wherein at least a portion of the upper surface has a decorative design thereon.

7. A solar stepping stone as claimed in claim 1 wherein the solar energy collector is formed so as to be adjacent the upper surface of the housing, the solar energy collector having a protective covering thereon to prevent damage from normal use of the solar stepping stone.

8. A solar stepping stone as claimed in claim 7 wherein the solar energy collector is formed around the periphery of the chamber.

9. A solar stepping stone as claimed in claim 1 wherein the solar energy collector is separated from the housing and connected to the solar power storage member by electrical connectors.

10. A solar stepping stone as claimed in claim 1 wherein the solar energy collector is located in an adjacent or proximal solar stepping stone and connected to the solar power storage member by electrical connectors.

11. A solar stepping stone as claimed in claim 1 further comprising a light sensor for detecting ambient light conditions, the light sensor switching the illumination member off when ambient light conditions exceed a predetermined threshold.

12. A solar stepping stone as claimed in claim 1 further comprising a manual on/off switch for activating or deactivating illumination member.

13. A solar stepping stone as claimed in claim 1 further comprising a motion detector associated with the solar stepping stone for detecting proximal motion such that the illumination member will only be switched on when proximal motion is detected.

14. A solar stepping stone as claimed in claim 1 further comprising a pressure sensor associated with the solar stepping stone for detecting proximal forces such that the illumination member will only be switched on when such forces are detected.

15. A solar stepping stone as claimed in claim 1 wherein the housing is comprised of a material selected from at least one of the following: resin, fiberglass, a resin and fiberglass mix, concrete, acrylics, plastics, aluminum or other metals, stone powder with resin, stone pebbles, slate or tile.

16. A solar stepping stone as claimed in claim 1 further comprising a timer means for setting the periods of time when the solar stepping stone will be activated and deactivated respectively.

17. A solar stepping stone as claimed in claim 1 wherein the illumination member is selected from at least one of the following: LED, light bulb.

18. A solar stepping stone as claimed in claim 1 wherein the illumination member illuminates at least a portion of the upper surface of the stepping stone.

19. A method of illuminating an outdoor pathway comprising:
    arranging a plurality of solar stepping stones with respect to each other so as to be spaced along a surface of the pathway;
    forming an illuminating member within a chamber contained within at least some of the solar stepping stones, the chamber being formed by a central cavity extending downwardly from an upper surface of the stepping stone;
    associating a solar energy collector with at least one solar stepping stone to collect solar energy during hours of sunlight;
    storing the collected solar energy in a solar power storage member located in the chamber of the solar stepping stone;
    selectively powering the illuminating member so as to provide illumination through a translucent or transparent lens formed in the upper surface of the solar stepping stone.

20. A method as claimed in claim 19 further comprising the step of attaching a light sensor to the solar stepping stone so that the illuminating member will only be activated when ambient light conditions fall below a preset value.

21. A solar stepping stone comprising:
    a housing having an upper surface, side walls and a lower surface, the housing defining at least one chamber comprising a recessed cavity extending downwardly from the upper surface of the housing;
    at least one solar energy collector associated with the housing for collecting solar energy;
    a solar power storage member associated with the housing for receiving and storing solar energy received from the solar energy collectors; and
    an illumination member for illuminating at least a portion of the solar stepping stone, the illumination member being powered by solar energy stored by the solar power member; and
    a transparent or translucent cover over the chamber, the cover being substantially flush with the upper surface of the housing, the chamber and cover providing an airtight and waterproof sealed space.

22. A solar stepping stone comprising:
    a housing having an upper surface, side walls and a lower surface, the housing defining at least one chamber comprising a recessed cavity extending downwardly from the upper surface of the housing;
    at least one solar energy collector associated with the housing for collecting solar energy and formed so as to be adjacent the upper surface of the housing, the solar energy collector having a protective covering thereon to prevent damage from normal use of the solar stepping stone;
    a solar power storage member associated with the housing for receiving and storing solar energy received from the solar energy collectors; and
    an illumination member for illuminating at least a portion of the solar stepping stone, the illumination member being powered by solar energy stored by the solar power member.

23. A solar stepping stone comprising:
    a housing having an upper surface, side walls and a lower surface, the housing defining at least one chamber comprising a recessed cavity extending downwardly from the upper surface of the housing;
    at least one solar energy collector associated with the housing for collecting solar energy;
    a solar power storage member associated with the housing for receiving and storing solar energy received from the solar energy collectors;

an illumination member for illuminating at least a portion of the solar stepping stone, the illumination member being powered by solar energy stored by the solar power member; and the solar energy collector being separated from the housing and connected to the solar power storage member by electrical connectors.

24. A solar stepping stone comprising:

a housing having ah upper surface, side walls and a lower surface, the housing defining at least one chamber comprising a recessed cavity extending downwardly from the upper surface of the housing;

at least one solar energy collector associated with the housing for collecting solar energy;

a solar power storage member associated with the housing for receiving and storing solar energy received from the solar energy collectors;

an illumination member for illuminating at least a portion of the solar stepping stone, the illumination member being powered by solar energy stored by the solar power member; and wherein the solar energy collector is located in an adjacent or proximal solar stepping stone and connected to the solar power storage member by electrical connectors.

* * * * *